United States Patent [19]

Cheng

[11] Patent Number: 5,680,237
[45] Date of Patent: Oct. 21, 1997

[54] GRADED INDEX LENS SYSTEM AND METHOD FOR COUPLING LIGHT

[75] Inventor: Yihao Cheng, Kanata, Canada

[73] Assignee: JDS Fitel Inc., Nepean, Canada

[21] Appl. No.: 558,537

[22] Filed: Nov. 16, 1995

[51] Int. Cl.⁶ ..................................................... H04J 14/02
[52] U.S. Cl. .......................... 359/131; 359/127; 385/34
[58] Field of Search .................................. 359/130, 129, 359/131, 127; 385/31, 33, 34, 36, 37

[56] References Cited

U.S. PATENT DOCUMENTS

| | | | |
|---|---|---|---|
| 4,472,797 | 9/1984 | Nicia | 359/129 |
| 4,550,975 | 11/1985 | Levinson et al. | 359/131 |
| 5,076,672 | 12/1991 | Tsuda et al. | 359/224 |
| 5,082,343 | 1/1992 | Coult et al. | 359/131 |

*Primary Examiner*—Wellington Chin
*Assistant Examiner*—Rafael Bacares
*Attorney, Agent, or Firm*—Neil Teitelbaum & Associates

[57] ABSTRACT

A lensing system is provided for coupling light from one optical fiber to another through a plurality of graded index (GRIN) lenses. The system is capable of coupling light of two significantly different wavelengths in a relatively efficient manner. More specifically, a first GRIN lens having at least two ports on an outwardly facing end face is provided for coupling light of one of the wavelenghts from one of the at least two ports to another of the at least two ports. A second GRIN lens typically being about one half pitch, having an end face juxtaposed to an end face of the first GRIN lens, is provided for, in combination with the first lens, adjusting for differences in the two significantly different wavelengths, so that light will efficiently be coupled between a third graded index lens and the first graded index lens that are of different lengths to accommodate for the different wavelengths of light. The third GRIN lens has an inwardly facing end face spaced apart from an inwardly facing end face of the second GRIN lens, and includes a port on an outwardly facing end face that is optically aligned with one of the ports on the first GRIN lens. The first lens GRIN lens and the second GRIN lens in combination collimate or focus light that is traversing a gap between the inwardly facing end face of the second GRIN lens to the inwardly facing end face of the third GRIN lens.

13 Claims, 2 Drawing Sheets

$\lambda_1 \approx \lambda_2$ $\lambda_1 \neq \lambda_2$ $\lambda_2 > \lambda_1$

GRADED INDEX LENS SYSTEM AND METHOD FOR COUPLING LIGHT

FIELD OF THE INVENTION

This invention relates generally to graded or gradient index lenses, and more particularly relates to situations wherein the coupling of optical signals having substantially differing wavelengths are launched into these lenses.

BACKGROUND OF THE INVENTION

Graded index (GRIN) lenses are commonly used to couple light from one optical fiber to another through an optical element. Fiber lenses of this type are produced under the trade name "SELFOC"; the mark is registered in Japan and owned by the Nippon Sheet and Glass Co. Ltd. When light propagating within an optical fiber is to be passed through a discrete optical element coupled to the optical fiber, the light must exit an end face of the fiber, be collimated, and the collimated beam must be directed towards the discrete optical element. In many instances, a GRIN lens capable of collimating diverging light rays exiting an optical fiber is disposed between the optical fiber a discrete optical element. In such an instance where light is to pass from one optical fiber to another through an optical element, a pair of matched quarter pitch GRIN lenses can be placed within a gap between the two optical fiber end faces. Thus, in operation light exits a first optical fiber, is collimated by a first quarter pitch GRIN lens, passes through a discrete optical element disposed between the pair of matched quarter pitched GRIN lenses, and is focused by the second quarter pitch GRIN lens of the pair into an end of a second optical fiber.

Since GRIN lenses are commonly available to meet a variety of specifications at a relatively low cost, and since these lenses are relatively compact, their use has become nearly ubiquitous in field of optoelectronics.

The system described heretofore, having a pair of matched collimating quarter pitch GRIN lenses, is well known and suitably performs its intended function when it is utilized with optical signals of substantially similar wavelengths. However, as a difference in wavelengths increases the efficiency and performance of such an optical system decreases.

It is therefore an object of the invention to provide an arrangement and method of coupling graded index lenses that provides increased efficiency when the wavelengths of the optical signals differ substantially.

SUMMARY OF THE INVENTION

In accordance with the invention there is provided a lensing system comprising a first GRIN lens having a length L1; a second GRIN lens having a length L2, said first GRIN lens having an end face adjacent a end face of the second GRIN lens; a third GRIN lens having a substantially collimating end facing and spaced apart from a substantially collimating end face of the second GRIN lens, the third lens having a length of L3.

In accordance with the invention there is further provided a lensing system for coupling light, comprising:

a first GRIN lens having at least two ports on an outwardly facing end face thereof, the first GRIN lens for coupling light from one of the at least two ports to another of the at least two ports;

a second GRIN lens having an end face juxtaposed to an end face of the first GRIN lens;

a third GRIN lens having an inwardly facing end face spaced apart from an inwardly facing end face of the second GRIN lens, the third GRIN lens having a port on an outwardly facing end face that is optically aligned with one of the ports on the first GRIN lens, the first lens GRIN lens and the second GRIN lens for collimating light that is traversing a gap between the inwardly facing end face of the second GRIN lens to the inwardly facing end face of the third GRIN lens.

Advantageously the invention provides a graded index lens or combination of back-to-back GRIN lenses that have a gradient that is suitable for altering substantially collimated light of a first wavelength so that it may be collimated or focused by another GRIN lens that would otherwise not collimate light at the first wavelength. Expressed differently, the invention provides a graded index lens or combination of back-to-back GRIN lenses having a graded index profile capable of adjusting a beam of a predetermined wavelength so that a subsequent GRIN lens being of a length L not matched to the predetermined wavelength of light can collimate or focus the beam.

BRIEF DESCRIPTION OF THE DRAWINGS

Exemplary embodiments of the invention will now be described in conjunction with the drawings, in which:

FIG. 1 is a side view of prior an optical coupling including a pair of matched quarter pitch GRIN lenses and WDM filter sandwiched between;

DETAILED DESCRIPTION

Figure 1:
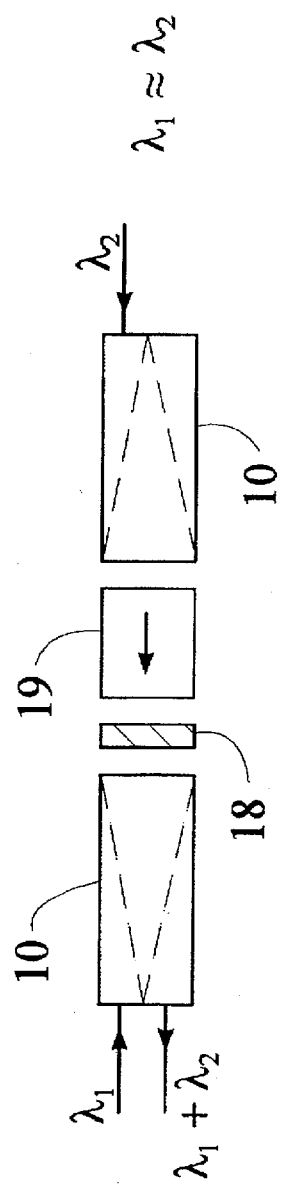

In the following description, it should be understood that same elements shown in different figures are assigned same reference numerals.

Referring now to prior art FIG. 1, first and second one quarter pitch GRIN lenses 10 are shown, an outer end face of the first lens (on the left) has input and output ports coupled to optical fibers; an outer end face of the second lens (on the right) has a single input port coupled to an optical fiber.

Focused light entering an end face of a 0.25 pitch GRIN lens, matched to the lens, and propagating through it, becomes collimated at an opposite end face of the lens. This is shown by way of example by a dotted outline representing a profile of a imaginary beam along the optical axis of the lens 10. In this figure, an optical coupling is shown that includes a WDM filter 18 adjacent an optical isolator 19 disposed between the pair of matched quarter pitch GRIN lenses 10.

Although in FIG. 1, a 0.25 pitch GRIN lens is utilized, for a greater understanding of SELFOC® lenses the following explanation is provided. A one pitch lens describes the length of a GRIN lens required for light of a particular wavelength to execute one cycle or one sine wave. For example if an object is placed on one end face of the lens, an erect one-to-one magnification image is formed on the other end face of the lens. Further, pitch P is directly proportional to the lens length (Z) as shown in the equation below:

$$Z = 2\pi P \sqrt{A} \qquad (1)$$

where $\sqrt{A}(\lambda)$ is the index gradient constant, a coefficient that shapes the parabolic function or gradient profile of the lens.

Since the pitch of a lens is proportional to the length and its length is proportional to a predetermined wavelength of light that will be propagating though the lens, a quarter pitch collimating lens having predetermined length (Z), collimates light of a predetermined wavelength. Stated differently, for light to be collimated by a particular 0.25 pitch GRIN lens, its length (Z) must be matched (see equation (1) above,) to the wavelength of the light it is capable of collimating.

In operation, the arrangement of optical elements, or coupler shown serves to couple light of two separate but similar wavelengths into a single optical fiber. Light having a wavelength $\lambda 1$ is launched into an input port of the first lens 10 and is reflected back by the WDM filter 18 to the output port on the same end face of the first lens 10. Light having a wavelength $\lambda 2$ launched into an input port on the other end face of the second GRIN lens 10 (on the right) propagates through the WDM filter 18 and is focused at the output port of the first GRIN lens 10 (on the left). Thus, light of wavelength $\lambda 1$ and $\lambda 2$ is combined and directed out of the device on the output port. The optical isolator 19 prevents any light of wavelength $\lambda 1$ or $\lambda 2$ from propagating in a direction from the filter 18 to the input port (on the right). Although this device in some instances provides its intended function of coupling two different wavelengths of light onto a single optical fiber, it becomes increasingly limited in efficiency as the difference between the two wavelengths of light increases. This is more clearly illustrated with reference to prior art FIG. 2.

Figure 2:
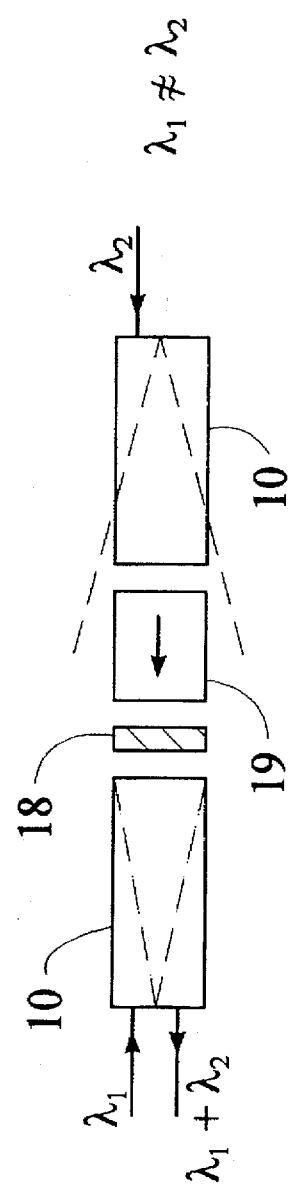
FIG. 2 is a side view of the prior an optical coupling shown in FIG. 1, illustrating the effect of launching two optical signals of substantially different wavelengths into different ends of the device.

In FIG. 2 light having a wavelength of $\lambda 1 = 980$ nm is launched into an input port of the first GRIN lens 10 (left). Light having a wavelength of $\lambda 2 = 1550$ nm is launched into an input port of the second GRIN lens 10 (right) destined for the WDM filter designed to pass light of wavelength $\lambda 2$ and reflect light of wavelength $\lambda 1$. Both GRIN lenses have a length L1 designed to focus collimated light of wavelength $\lambda 1$ at a focusing end, and adapted to collimate focused light of wavelength $\lambda 1$ at an opposite collimating end. As is illustrated, the light of wavelength $\lambda 2$ exiting the inwardly facing end face of the second lens 10 (right) is diverging and only a portion of the light reaches its intended destination. Much of the light is lost and the coupling efficiency of this optical system is low.

Figure 3:
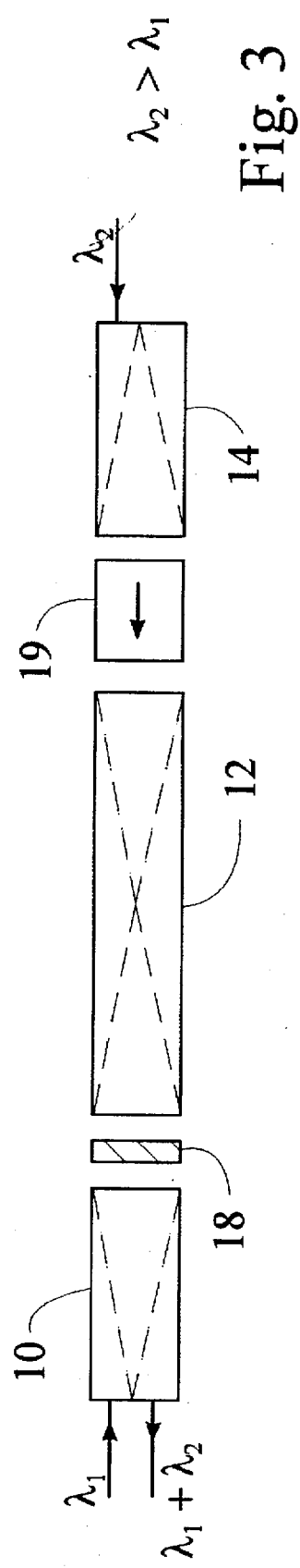
FIG. 3 is a side view of an optical coupling in accordance with a first embodiment of this invention.

Referring now to FIG. 3, an optical system is provided that more efficiently couples light of significantly different wavelengths. A first quarter pitch GRIN lens 10 having a length L1, selected to collimate (or focus) light of wavelength $\lambda 1 = 980$ nm is provided having an input port and an output port at a focusing end of the lens, essentially identical to the lens 10 shown in FIG. 2. A second GRIN lens 12 of length L2 and having pitch of nearly or substantially 0.5 is disposed next to the first lens. A WDM filter 18 designed to reflect light of wavelength $\lambda 1$ and pass light of wavelength $\lambda 2$ is disposed between the two lenses 10 and 12. A third GRIN lens, having a pitch of 0.25 and a length L3 designed to collimate light of wavelength $\lambda 2$ is coaxial with and adjacent to the lens 12. An optical element 19 in the form era isolator is located between the lens 12 and the lens 14. Although the wavelengths of the two optical signals launched into this optical system differ significantly, the light launched into the two input ports is efficiently coupled to the output port of the lens 10. The presence of the lens 12 ensures that the collimated light of wavelength $\lambda 2$ entering its end face (left), will be correctly focused at the output port of the lens 10. Preferably, the lengths of the lenses are selected such that $L1+L2 \approx n0.75L3$, where n is an integer; most conveniently n can be equal to 1 shown in the present embodiment.

Although the second GRIN lens 12 embodies a single optical element, alternatively, the second lens can comprise two separate optical elements conveniently in the form of back-to-back substantially quarter pitch GRIN lenses. The optical elements 18 and 19 are shown disposed within a gap between lenses, however, the provision of a gap and its dimensions are optional and depend upon specific design choices and requirements; one or more of the lenses may abut and contact the one or more of the optical elements. Further, the WDM filter may alternatively be in the form of an optical coating applied to an end face of one of the GRIN lenses.

Figure 4:
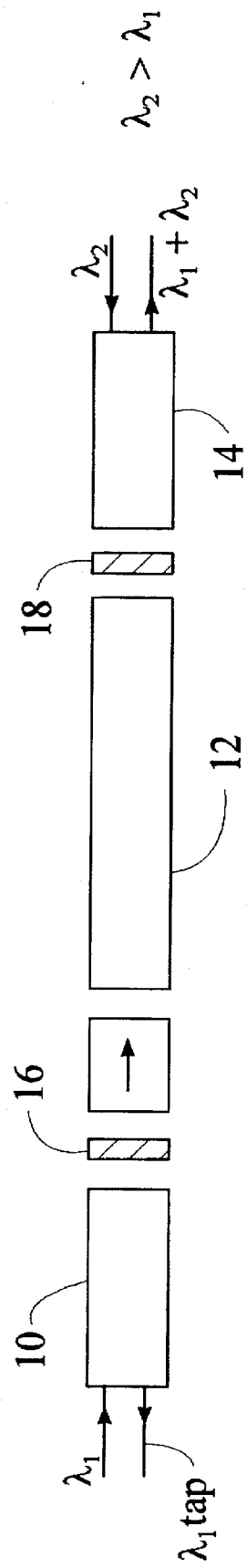
FIG. 4 is a side view of an optical device in accordance with an second of the invention having a tapping port for tapping some of the input light; and, FIG. 5 is a side view of an optical arrangement similar to what is shown in FIG. 4, including isolation means.

Turning now to FIG. 4, an embodiment similar to that of FIG. 3 is shown however, the first lens 10 is provided with an input port and a port for tapping some of the input light. The input port is shown to provide a path for a signal of wavelength $\lambda 1$, however multiple wavelengths compatible with the optical partially reflecting coating 16 could be launched into the device via the input port. An optical isolator is provided between the coating 16 and the lens 12. On the other side of the device, an output end of the lens 14 includes an input port for launching light of wavelength $\lambda 2$ and an output port for carrying the combined light signal of wavelength $\lambda 1+\lambda 2$. In operation, most of the light of wavelength $\lambda 1$ is combined with light of wavelength $\lambda 2$ at the output and a small fraction of the light of wavelength $\lambda 1$ is provided to the tap port; the ratio of tapped to transmitted light is dependent upon the reflective/transmissive characteristics of the optical coating 16.

Figure 5:
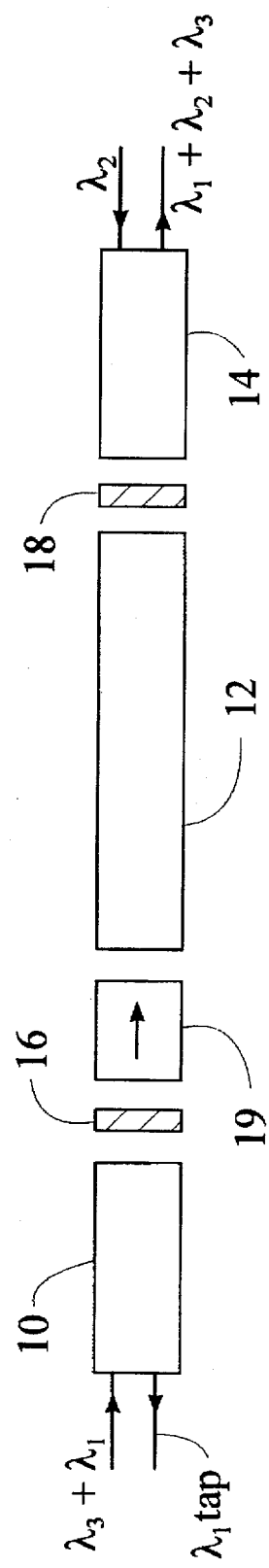

In FIG. 5 an alternative embodiment is shown similar to the one of FIG. 4. The optical device includes a first quarter pitch GRIN lens 10 suitable for collimating light of wavelengths $\lambda 1$ and $\lambda 3$ that are near the same wavelength and for focusing some light $\lambda 1$ back to a tapping port. 16 and 12 function in essentially the same manner as described heretofore. Between and end face of the lens 12 and the lens 14 is disposed a thin WDM filter 18. The lens 14 is provided with an input port for launching light of wavelength $\lambda 2$ and an output port for receiving light of wavelength $\lambda 1+\lambda 2+\lambda 3$. Since the wavelengths $\lambda 1$ and $\lambda 3$ are substantially the same and approximately equal to 980 nm the length L1 of the lens 10 is selected accordingly. As $\lambda 2$ is substantially greater 1550 nm, the length L3 of the lens 14 is longer than L1 and is selected to collimate light of wavelength $\lambda 2$. Preferably the lenses are selected such that L1+L2 is substantially equal to ¾ L3.

Of course numerous other embodiments may be envisaged without departing from the spirit and scope of the invention.

What I claim is:

1. A lensing system for coupling at least two wavelengths of light comprising:
   a) a first GRIN lens having a length L1 selected to substantially collimate or focus a first wavelength of light;
   b) a second GRIN lens having an end face that is at least partially collimating for the first wavelength of light and an end that is substantially collimating for the second wavelength of light and a length L2 selected to alter the direction of the rays of one of the first and second wavelengths of light passing through it, the first GRIN lens having a substantially collimating end face facing the at least partially collimating end face of the second GRIN lens; and, c) a third GRIN lens having a substantially collimating end facing and spaced apart from the substantially collimating end face of the second GRIN lens, the third lens having a length of L3 selected to collimate or focus the second wavelength of light.

2. A lensing system as defined in claim 1, wherein the second GRIN lens is comprised of two back-to-back optical elements for providing a substantially half pitch lens.

3. A lensing system as defined in claim 1, wherein L2≠2L1.

4. A lensing system as defined in claim 3, wherein the first GRIN lens and the third GRIN lens are substantially quarter pitch GRIN lenses of different length.

5. A lensing system as defined in claim 1, including an optical element disposed between the third GRIN lens and the second GRIN lens.

6. A lensing system as defined in claim 1, including an optical element and/or coating sandwiched between the end face of the first GRIN lens and the end face of the second GRIN lens.

7. A lensing system as defined in claim 1, wherein L1<L3.

8. A lensing system as defined in claim 1, wherein L1>L3.

9. A lensing system for coupling at least two wavelengths of light comprising:

a) a first GRIN lens having a length L1 selected to substantially collimate or focus the first wavelength of light;

b) a second GRIN lens having a length L2 selected to alter the direction of the rays of one of the first and second wavelengths of light passing through it, the first GRIN lens having an end face adjacent a end face of the second GRIN lens; and, c) a third GRIN lens having a substantially collimating end facing and spaced apart from a substantially collimating end face of the second GRIN lens, the third lens having a length of L3 selected to collimate or focus the second wavelength of light, wherein L2≠2L1, and wherein an outwardly facing end face of one of the first GRIN lens and the third GRIN lens includes at least two ports for receiving or transmitting light, and wherein the other outwardly facing end face includes at least one port for receiving or transmitting light, the at least two ports being optically aligned, and one of the at least two ports being optically aligned with the at least one port.

10. A lensing system for coupling light, comprising:

a first GRIN lens having at least two ports on an outwardly facing end face thereof, the first GRIN lens for coupling light from one of the at least two ports to another of the at least two ports;

a second GRIN lens having an end face that is non-focusing disposed to receive light from an end face of the first GRIN lens, an another end face that is substantially collimating;

a third GRIN lens having an inwardly facing end face spaced apart from an inwardly facing end face of the second GRIN lens, the third GRIN lens having a port on an outwardly facing end face that is optically aligned with one of the ports on the first GRIN lens, the first lens GRIN lens and the second GRIN lens for collimating or focusing light that is traversing a gap between the inwardly facing end face of the second GRIN lens to the inwardly facing end face of the third GRIN lens.

11. A lensing system as defined in claim 10, wherein the second GRIN lens is a substantially half pitch GRIN lens comprised of two back-to-back substantially collimating substantially quarter pitch optical elements.

12. A method for providing an optical coupling comprising the steps of:

providing a first collimating GRIN lens having a length L1, substantially corresponding to collimating a first wavelength of light;

providing a third collimating GRIN lens having a length L3, substantially corresponding to collimating a third substantially different wavelength of light;

providing a second GRIN lens arrangement between inwardly facing end faces of the first and third GRIN lenses, the first and second GRIN lenses in combination for providing a substantially collimated beam of light for the second substantially different wavelength of light.

13. A lensing system as defined in claim 1, wherein L1+L2 is substantially equal to an integer multiple of ¾ L3.

* * * * *